United States Patent Office 3,293,252
Patented Dec. 20, 1966

3,293,252
BENZAZABORINONE DERIVATIVES AND
RELATED COMPOUNDS
Josef Fried, Chicago, Ill., and Frank Herbert Bergeim, Highland Park, and Harry Louis Yale and Jack Bernstein, New Brunswick, N.J., assignors, by mesne assignments, to E. R. Squibb & Sons Inc., New York, N.Y., a corporation of Delaware
No Drawing. Filed Nov. 12, 1963, Ser. No. 323,058
13 Claims. (Cl. 260—268)

This application is a continuation-in-part of application Serial No. 266,484, filed March 20, 1963, which is in turn a continuation-in-part of application Serial No. 140,255, filed September 25, 1961, both now abandoned.

This invention relates to cyclic boron compounds. More particularly, the invention relates to compounds represented by the structural formula.

(I)
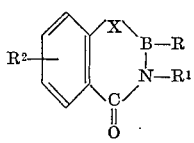

In the above formula, the symbol R represents hydroxy, alkyl, cycloalkyl, aryl and aralkyl groups. The aryl groups represented by R include the monocyclic phenyl group or bicyclic naphthyl group each of which may in addition bear one or more (preferably up to three) substituents such as lower alkyl, e.g. methyl, ethyl, propyl, isopropyl, butyl and the like, a halogen, e.g. chlorine, bromine, iodine or fluorine, hydroxy, or a lower alkoxy group such as methoxy, ethoxy and the like. In other words the aryl groups represented by R may be expressed as $(Y)_r$-phenyl and $(Y)_r$-naphthyl, Y being hydrogen, halogen, lower alkyl, lower alkoxy or hydroxy and $r$ being an integer from 0 to 3. The aralkyl groups represented by R include the phenyl group, substituted or unsubstituted as described above, attached to a straight or branched chain lower alklene chain. The alkyl groups represented by R are preferably lower alkyl groups such as those illustrated above and the cycloalkyl groups include cycloaliphatic groups, preferably of 3 to 7 carbon atoms, such as cyclopropyl, cyclobutyl, cyclopentyl, cyclohexyl and cycloheptyl.

$R^1$ represents aryl and aralkyl as defined above for R. It also represents basic groups such as di-lower alkyl-amino-lower alkyl groups, e.g., dimethylaminoethyl, dimethyl aminomethyl, diethylaminoethyl, and the like; the nitrogen of the basic group may also be part of a 5- to 7-membered heterocyclic to form substituents such as N-pyrrolodinomethyl, N-piperidinomethyl, N-piperidinopropyl, N-morpholinomethyl, $N^4$-methylpiperazinopropyl, $N^4$ - hydroxyethylpiperazinoethyl, $N^4$ - methylhomopiperazino and the like. In other words $R^1$ represents basic nitrogen groups of the formula

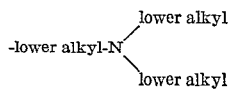

or

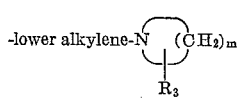

or

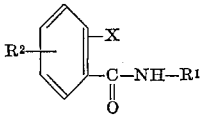

wherein $m$ is 4 to 6, $n$ is 3 to 5 and $R_3$ is lower alkyl, hydroxy-lower alkyl or lower alkoxy-lower alkyl.

$R^2$ is representative of hydrogen, halogen, nitro, amino, NH-acyl, N(acyl)-$R^4$, sulfonamido, lower alkyl, lower alkoxy and haloalkyl. The lower alkyl and lower alkoxy groups are of the character described previously in the discussion of the symbol R. The haloalkyl groups represented by $R^2$ include monohalogenated groups such as chloromethyl, bromoethyl and the like, as will as polyhalogenated groups such as trifluoromethyl. Any halogen may appear in these substituents.

The acyl groups referred to above are lower alkanoyl groups represented by formyl, acetyl, propionyl and the like.

X in formula, represents oxygen, sulfur, NH or N—$R^5$. $R^4$ and $R^5$ each represents di-lower alkylamino-lower alkylene or heterocyclic-lower alkylene groups such as those discussed above with respect to $R^1$.

Preferred in the class of compounds of Formula I are those in which X represents N—H. A second preferred group constitutes those compounds of Formula I in which the nitrogen adjacent to the keto group bears a 2,6-dialkylphenyl group, especially 2,6-dimethylphenyl.

The compounds of Formula I are produced by reacting an appropriately substituted benzamide, i.e. a compound of the formula (II)
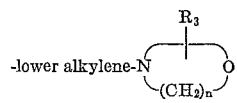

wherein $R^1$, $R^2$ and X have the meaning already defined, with a boronic acid of the formula (III)            R—B—(OH)$_2$ wherein R has the meaning already defined.

The reaction between the benzamide and boronic acid is preferably effected in a non-aqueous medium, e.g. a hydrocarbon solvent such as xylene, toluene, petroleum ether, or the like or another inert solvent such as diethyleneglycol dimethyl ether, dioxane, carbon tetrachloride, etc., or mixtures thereof. A mixture of the reactants may be heated and the water formed in the reaction is removed azeotropically. Anhydrous reactants and solvents contribute to a more effective reaction.

Compounds of this invention include for example, 2,3-dihydro-3-(2,6-dimethylphenyl)-2-phenyl-1,3,2-benzodiazaborin-4(1H)-one,
2,3-dihydro-3(2,6-dibromophenyl)-2-phenyl-1,3,2-benzodiazaborin-4(1H)-one,
2,3-dihydro-(2,6-dimethoxyphenyl)-2-(1-naphthyl)-1,3,2-benzodiazaborin-4(1H)-one,
3-benzyl-2,3-dihydro-2-phenyl-1,3,2-benzodiazaborin-4(1H)-one,
2,3-dihydro-3(3-dimethylaminopropyl)-2-phenyl-1,3,2-benzodiazaborin-4(1H)-one,
3-(2,6-diethylphenyl)-2,3-dihydro-2-(1-naphthyl)-1,3,2-benzodiazaborin-4(1H)-one,
2,3-dihydro-3-(2,6-dibutylphenyl)-2-(1-naphthyl)-1,3,2-benzodiazaborin-4(1H)-one, 3-(2,6-dimethylphenyl)-2,3-dihydro-2-hydroxy-1,3,2-benzodiazaborin-4(1H)-one,
2,3-dihydro-2,3-diphenyl-4H-1,3,2-benzoxazaborin-4(1H)-one,
6-chloro-2,3-dihydro-3-(2,6-dimethylphenyl)-2-(o-tolyl)-1,3,2-benzodiazaborin-4(1H)-one,
2,3-dihydro-6-methyl-2-(p-chlorophenyl)-3-(2,6-dimethoxyphenyl)-1,3,2-benzodiazaborin-4(1H)-one,
2-(4-anisyl)-2,3-dihydro-3-(2,6-dichlorophenyl)-6-sulfonamido-1,3,2-benzodiazaborin-4(1H)-one,
2,3-dihydro-3-(2,6-diisopropylphenyl)-2-(2-naphthyl)-7-sulfonamido-1,3,2-benzodiazaborin-4(1H)-one,
2,3-dihydro-1-(3-dimethylaminopropyl)-2-phenyl-1,3,2-benzodiazaborin-4(1H)-one,
2,3-di-(o-chlorophenyl)-2,3-dihydro-1,3,2-benzothiazaborin-4(1H)-one,
2,3-dihydro-2-mesityl-3-naphthyl-1,3,2-benzothiazaborin-4(1H)-one,
2,3-dihydro-2-(2-naphthyl)-1-[3-(1-piperidino)propyl]-1,3,2-benzodiazaborin-4(1H)-one,
2,3-dihydro-2-(2,4-dimethylphenyl)-1-(morpholinomethyl)-1,3,2-benzodiazaborin-4(1H)-one, and
3-benzyl-2,3-dihydro-2-(n-propyl)-1,3,2-benzodiazaborin-4(1H)-one.

The compounds of this invention have central depressent activity and are useful in psychotherapy. They may be administered orally or parenterally in conventional vehicles according to accepted practice.

The following examples are illustrative of the invention. All temperatures are stated on the centigrade scale.

Example 1

(a) To 36.3 g. of 2,6-dimethylaniline in 300 ml. of anhydrous chloroform are added 18.6 g. of 2-nitrobenzoyl chloride (prepared from o-nitrobenzoic acid and thionyl chloride in chloroform). The mixture is refluxed for 1 hour, the solid filtered, suspended in dilute aqueous ammonium hydroxide solution and filtered again to give N-(2,6-dimethylphenyl)-2-nitrobenzamide, M.P. 210–211°.

(b) The product from (a) is hydrogenated over 5% palladium on carbon in absolute ethanol at about 45° and under 50 lbs. of pressure to give 2-amino-N-(2,6-dimethylphenyl)benzamide, M.P. 130–132°.

(c) The product from (b), 2.40 g., 1.22 g. of benzeneboronic acid and 100 ml. of xylene are refluxed for 4 hours, the water formed being separated continuously. The cooled reaction mixture deposits 2,3-dihydro-2-phenyl-3-(2,6-dimethylphenyl)-1,3,2-benzodiazaborin-4(1H)-one, M.P. 265–267°.

In similar fashion, following the procedure of Example 1(a) but substituting an equivalent amount of the following substituted 2-nitrobenzoyl chlorides for the 2-nitrobenzoyl chloride in the example, and then utilizing the 2-nitrobenzamide derivative thus obtained in the procedure of Example 1(b) to give the 2-aminobenzamide derivative, and the 2-aminobenzamide derivative reacted with benzeneboronic acid as in Example 1(c), there are obtained the following benzenediazaborin-4-(1H)-one derivatives.

| Ex. No. | Substituent in 2-nitro-benzoyl Chloride | Substituent in N-(2,6-dimethylphenyl) 2-nitrobenzamide | Substituent in N-(2,6-dimethylphenyl) 2-aminobenzamide | Substituent in 2,3-dihydro-2-phenyl-3-(2,6-dimethylphenyl)-1,3,2-benzodiazaborin-4-(1H)-one |
|---|---|---|---|---|
| 2 | 4-sulfonamido | 4-sulfonamido | 4-sulfonamido | 7-sulfonamido. |
| 3 | 4-chloro | 4-chloro | 4-chloro | 7-chloro. |
| 4 | 4-bromo | 4-bromo | 4-bromo | 7-bromo. |
| 5 | 4-methoxy | 4-methoxy | 4-methoxy | 7-methoxy. |
| 6 | 3-sulfonamido | 3-sulfonamido | 3-sulfonamido | 8-sulfonamido. |
| 7 | 3-chloro | 3-chloro | 3-chloro | 8-chloro. |

In similar fashion, by substituting equivalent amounts of the following boronic acids for the benzene-boronic acid in Example 1(c), there obtained the following 2-substituted - 2,3 - dihydro-3-(2,6-dimethylphenyl)-1,3,2-benzodiazaborin-4-(1H)-ones.

| Example No. | Boronic Acid | 2-Substituent in the 2,3-dihydro-3-(2,6-dimethylphenyl)-1,3,2-benzodiazaborin-4(1H)-one |
|---|---|---|
| 8 | 1-naphthyl | 2-(1-naphthyl). |
| 9 | 2-tolyl | 2-(2-tolyl). |
| 10 | n-Butyl | 2-(n-butyl). |
| 11 | 2-phenethyl | 2-(2-phenethyl). |

Example 12

(a) To 10 g. of isatoic anhydride suspended in 125 ml. of 95% ethanol are added dropwise 6.4 g. of redistilled benzylamine. Solution occurs within about 10 minutes, followed promptly by separation of the product. The mixture is stirred for one hour, cooled and filtered to obtain the product o-amino-N-benzylbenzamide, which is recrystallized from Skellysolve E, M.P. 121–122°.

(b) A mixture of 3.14 g. of 2-amino-N-benzylbenzamide, 1.7 g. of benzeneboronic acid and 100 ml. of dry xylene are refluxed for 2.5 hours under a Dean-Stark trap and then cooled. The solid which crystallizes is filtered off. The product, 3-benzyl-2,3-dihydro-2-phenyl-1,3,2-benzodiazaborin-4(1H)-one, is recrystallized from 150 ml. of Skellysolve E, M.P. 190–192°.

Example 13

(a) To 10 g. of isatoic anhydride suspended in 125 ml. of 95% ethanol are added 6.5 g. of redistilled 3-dimethyl-aminopropylamine. The solution is stirred for one hour at room temperature and concentrated to dryness on a steam bath. The residual oil is distilled, B.P. 174° (0.05 mm.). The distillate crystallizes spontaneously. The product 2-amino-N-(3-dimethylaminopropyl) benzamide, is recrystallized from Skellysolve E, M.P. 76–78°.

(b) 4.4 g. of 2-amino-N-(3-dimethylaminopropyl)-benzamide and 2.44 g. of benzeneboronic acid are refluxed in xylene under a Dean-Stark trap for two hours. The hot reaction mixture is filtered and the product allowed to crystallize in the cooled filtrate. The product, 3 - (3-dimethylaminopropyl)-2,3-dihydro-2-phenyl-1,3,2-benzodiazaborin-4(1H)-one, is vacuum dried.

Example 14

(a) 1.0 mole of naphthylmagnesium bromide is prepared in dry ether and diluted with an equal volume of dry toluene to help dissolve the insoluble Grignard reagent. The incremental addition technique is employed with tributyl borate at −60°. The 1-naphthaleneboronic acid is recrystallized from chlorobenzene, M.P. 203–204°.

(b) 3.14 g. (0.014 mole) of 2-amino-N-benzylbenzamide and 2.4 g. (0.014 mole) of 1-naphthalene boronic acid and 100 ml. of dry xylene are refluxed under a Dean-Stark trap for 18 hours. The product, 3-benzyl-2,3-dihydro - 2 - (1-naphthyl)-1,3,2-benzodiazaborin-4(1H)-one, crystallizes from the cooled reaction mixture and is recrystallized from dry xylene, M.P. 218–220°.

Example 15

(a) To 21 g. of 6-chloroisatoic anhydride are added 14.3 g. of 3-(N⁴-methylpiperazino)propylamine (prepared from N⁴-methylpiperazinopropyl chloride and phthalimide followed by hydrolysis. The procedure of Example 13(a) is followed to give 2-amino-N-3-(N⁴-methylpiperazino)-propylbenzamide.

(b) Following the procedure of Example 13(b) but using an equivalent amount of the product from (a) for the 2-amino-N-(3-dimethylaminopropyl)benzamide, there is obtained 3-(N⁴-methylpiperazino)propyl-2,3-dihydro-2-phenyl-1,3,2-benzodiazaborin-4(1H)-one.

Example 16

(a) To 22.4 g. of 6-nitroisatoic anhydride are added 24.2 g. of 2,6-dimethylaniline and 250 ml. of methanol. The mixture is stirred vigorously and heated under reflux until a clear solution is formed. The methanol is distilled and the residue cooled to give N-(2,6-dimethylphenyl)-2-amino-5-nitrobenzamide.

(b) The procedure of Example 1(c) is followed but an equivalent amount of the product from (a) for the 2-amino-N-(2,6-dimethylphenyl)benzamide, there is obtained 2,3 - dihydro - 6 - nitro - 2-phenyl-3-(2,6-dimethylphenyl)-1,3,2-benzodiazaborin-4(1H)-one.

(c) The product from (b), 10 g. and 1 g. 5% palladium on carbon in 200 ml. of absolute ethanol are hydrogenated under 50 lbs. of pressure to give 6-amino-2,3-dihydro - 2 - phenyl-3-(2,6-dimethylphenyl)-1,3,2-benzodiazaborin-4(1H)-one.

(d) The product from (c) 6.8 g. and 3.2 g. of acetyl chloride in 50 ml. of tetrahydrofuran are heated under reflux for 0.5 hr. and concentrated in vacuo to give 6-acetamido - 2,3 - dihyrdo - 2 - phenyl - 3 - (2,6-dimethylphenyl)-1,3,2-benzodiazaborin-4(1H)-one.

(e) The product from (d) 3.83 g., 0.5 g. of sodium hydride and 50 ml. of tetrahydrofuran are stirred and heated under reflux for 1 hour, cooled and 1.4 g. of 3-dimethylaminopropyl chloride in 10 ml. of tetrahydrofuran added. The mixture is stirred and heated under reflux for 2 hours, filtered and the filtrate concentrated to give 6-[(N-acetyl)-N-(3-dimethylaminopropyl)]amino-2,3 - dihydro - 2 - phenyl - 3 - (2,6-dimethylphenyl)-1,3,2-benzodiazaborin-4(1H)-one.

Example 17

By substituting an equivalent amount of 3-(N⁴-methylpiperazino)propyl chloride for the 3-dimethylamino-propyl chloride in Example 16, there is obtained 6-{(N-acetyl) - N - [3-(N⁴-methylpiperazino)propyl]amino}-2,3-dihydro-2-phenyl-3-(2,6 - dimethylphenyl)-1,3,2-benzodiazaborin-4(1H)-one.

Example 18

(a) By substituting an equivalent amount of trimethylene chlorobromide for the 3-dimethylaminopropyl chloride in Example 16, there is obtained 6-[(N-acetyl)-N-(3-chloropropyl)] - amino-2,3-dihydro-2-phenyl-3-(2,6-dimethylphenyl)-1,3,2-benzodiazaborin-4(1H)-one.

(b) The product from (a) 4.60 g., 2.6 g. of piperazine-ethanol, 1.5 g. of sodium iodine and 50 ml. of methyl ethyl ketone are stirred and refluxed for 6 hours, filtered, and the filtrate concentrated to dryness to give 6-{(N-acetyl) - N - [3-(N⁴-methylpiperazino)propyl]amino}2,3-dihydro-2-phenyl-3(2,6-dimethylphenyl) - 1,3,2 - benzodiazaborin-4(1H)-one.

Example 19

A mixture of 1.64 g. of N-phenyl-o-aminobenzamide, 1.04 g. of trimethyl borate and 120 ml. of dry xylene is distilled slowly for four hours. During this time the still head temperature rises slowly and reaches a maximum of 120°. The clear solution is concentrated to dryness in vacuo. The residual gum is triturated with ether, partial solution occurs and a solid separates. The solid is filtered, air dried, extracted with 100 ml. of Skellysolve E at the boiling point and filtered from the insoluble solid. The filtrate on cooling, deposits a solid, 2,3-dihydro - 2 - hydroxy-3-phenyl-1,3,2-benzodiazaborin-4(1H)-one, which is filtered and dried.

Example 20

A solution of 1.85 g. of o-amino-N-benzylbenzamide, 0.85 g. of trimethyl borate and 125 ml. of dry xylene are distilled slowly for two hours. The still head temperature rises slowly from 40 to 130° and a solid separates from the clear solution. The reaction mixture is cooled and the precipitate, a mixture of white and yellow solid, is filtered and dried. The white solid 3-benzyl-2,3-dihydro-2-hydroxy-1,3,2-benzodiazaborin-4(1H)-one, is separated mechanically and recrystallized from xylene, M.P. 315°.

Example 21

20.6 g. of N-(1-naphthyl)salicylamide and 18.3 g. of benzene-boronic acid in 300 ml, of anhydrous toluene are refluxed under a Dean-Stark trap. The toluene solution is filtered while hot and the product crystallizes from solution as the filtrate cools to room temperature. The white product, 2,3-dihydro-3-(1-naphthyl)-2-phenyl-1,3,2-benzoxazaborin-4(1H)-one is filtered under suction, washed with toluene, dried in vacuo and recrystallized from acetonitrile, M.P. 201–203°.

Example 22

(a) To a solution of 19.8 g. of 6-chloroisatoic anhydride in 200 ml. of 95% ethanol is added 20 ml. of p-chloroaniline. The solution which formed is concentrated to give N-(p-chlorophenyl)-5-chloroanthranilamide.

(b) A mixture of 13.1 g. of N-(p-chlorophenyl)-5-chloroanthranilamide, 10.4 g. of trimethyl borate and 200 ml. of dry xylene are reacted as in Example 19 to give 6-chloro-3-(p-chlorophenyl)-2,3-dihydro-2-hydroxy-1,3,2-benzodiazaborin-4(1H)-one.

Example 23

(a) By substituting 17.8 g. of 6-methylisatoic anhydride (prepared from 3-amino-p-toluic acid and phosgene in aqueous potassium carbonate solution) for the 6-chloroisatoic anhydride in Example 22(a) there is obtained N-(p-chlorophenyl)-5-methylanthranilamide.

(b) By substituting 11.6 g. of the product from (a) for the anthranilamide compound in Example 22(b) there is obtained 2,3-dihydro-6-methyl-2-hydroxy-3-(p-chlorophenyl)-1,3,2-benzodiazaborin-4(1H)-one.

Example 24

(a) A mixture of 21.5 g. of 5-sulfonamido-N-phenyl-anthranilamide (prepared from 5-sulfoanthranilic acid by treatment first with thionyl chloride in the presence of 1–5% by volume of N,N-dimethylformamide to give the 5-chlorosulfonylanthraniloyl chloride hydrochloride, followed by treatment first with aniline and then with ammonia) 15.2 g. Of 4-anisoleboronic acid and 800 ml. of dry xylene are reacted as in Example 22(b) to give 2-(4-anisyl)-2,3-dihydro-3-phenyl - 6 - sulfonamido-1,3,2-benzodiazaborin-4-(1H)-one.

Example 25

(a) By substituting 21.5 g. of 4-sulfonamido-N-phenyl-anthranilamide [prepared from 4-sulfonanthranilic acid] for the 5-sulfonamidoanthranilamide and 17.2 g. of 2-naphthaleneboronic acid for the 4-anisoleboronic acid as described in Example 24(a), there is obtained 2,3-dihydro-2-(2 - naphthyl)-3-phenyl-7-sulfonamido-1,3,2-benzodiazaborin-4(1H)-one.

Example 26

(a) To a solution of 19.3 g. of anhydrous sodium carbonate in 150 ml. of water is added portionwise 50 g. of anthranilic acid, followed by 50 g. of 3-dimethylaminopropyl chloride, also added slowly. The mixture is stirred and refluxed for two hours to give 63 g. of N-(3-dimethylaminopropyl)anthranilic acid.

(b) To 15 g. of anhydrous potassium carbonate in 300 ml. of water is added slowly 62.5 g. of the product from (a) above, followed by the slow addition of 37.0 g. of ethyl chloroformate. The precipitated solid is filtered to give 70.3 g. of N-carboxy-N-(3-dimethylaminopropyl)anthranilic acid, N-ethyl ester.

(c) The product from (b) is placed in a preheated oil bath at 220° and heated one-half hour at 220° to give 35.6 g. of 1-(3-dimethylaminopropyl)isatoic anhydride.

(d) The product from (c), 35.0 g., is suspended in 450 ml. of 95% ethanol and 10 ml. o-chloroaniline added. Subsequently, the alcohol solution is concentrated to give 19.8 g. of N-(o-chlorophenyl)-o-(3-dimethylaminopropyl)-aminobenzamide.

(e) The reaction between 2.19 g. of the produce from (d) above and 1.2 g. of benzeneboronic acid is carried out in 100 ml. of dry toluene as described in Example 22(b) to give 2.6 g. of 3-(o-chlorophenyl)-2,3-dihydro-1 - (3 - dimethylaminopropyl) - 2 - phenyl - 1,3,2 - benzodiazaborin-4(1H)-one.

*Example 27*

A solution of 1.53 g. of N-phenyl thiosalicylamide, 1.56 g. of o-chlorobenzeneboronic acid and 150 ml. of Skellysolve E (a petroleum ether with a boiling point range of 100–120°) is refluxed under a Dean-Stark trap until no more water separates. The hot solution is filtered and the filtrate cooled to give 2.6 g. of 2-(o-chlorophenyl)-2,3-dihydro-3-phenyl - 1,3,2 - benzothiazaborin-4(1H)-one.

*Example 28*

By substituting 1.64 g. of mesityleneboronic acid for the benzeneboronic acid in Example 12(b), there is obtained 3 - benzyl - 2,3 - dihydro-2-mesityl-1,3,2-benzodiazaborin-4(1H)-one.

*Example 29*

By substituting 1.76 g. of N-propaneboronic for the benzeneboronic acid in Example 12(b), there is obtained 3-benzyl-2,3-dihydro-2-(n-propyl)-1,3,2-benzodiazaborin-4(1H)-one.

*Example 30*

Following the procedure of Examples 16(a) and (b), but substituting 7-(trifluoromethyl)isatoic anhydride as the starting material there is obtained 2,3-dihydro-7-(trifluoromethyl) - 2 - phenyl-3-(2,6-dimethylphenyl)-1,3,2-benzodiazaborin-4(1H)-one.

*Example 31*

By the procedure of Example 21, using the appropriately substituted salicylamide in place of the N-(1-naphthyl) salicylamide and substituted boronic acid (in the manner of Examples 1 to 20) the following compounds are obtained:

2,3-dihydro-2-phenyl-3-(2,6-dimethylphenyl)-1,3,2-benzoxazaborin-4(1H)-one;
2,3-dihydro-2-phenyl-3-(2,6-dimethylphenyl)-7-sulfonamido-1,3,2-benzoxazaborin-4(1H)-one;
2,3-dihydro-2-phenyl-3-benzyl-7-chloro-1,3,2-benzoxazaborin-4(1H)-one;
2,3-dihydro-2-(2-tolyl)-3-(phenethyl)-7-bromo-1,3,2-benzoxazaborin-4(1H)-one;
2,3-dihydro-2-(n-butyl)-3-(2,6-dimethylphenyl)-1,3,2-benzoxazaborin-4(1H)-one;
2,3-dihydro-2-hydroxy-3-(p-chlorophenyl)-7-(trifluoromethyl)-1,3,2-benzoxazaborin-4(1H)-one;
2,3-dihydro-2-mesityl-3-benzyl-7-methoxy-1,3,2-benzoxazaborin-4(1H)-one;
2,3-dihydro-2-n-propyl-3-(2,6-dimethylphenyl)-6-methyl-1,3,2-benzoxazaborin-4(1H)-one;
2,3-dihydro-2-phenyl-3-(2,6-dimethylphenyl)-8-sulfonamido-1,3,2-benzoxazaborin-4(1H)-one;
2,3-dihydro-2-phenyl-3-(2,6-dimethylphenyl)-7-methoxy-1,3,2-benzoxazaborin-4(1H)-one;
2,3-dihydro-2-phenyl-3-(2,6-dimethylphenyl)-8-chloro-1,3,2-benzoxazaborin-4(1H)-one.

*Example 32*

By the procedure of Example 27, using the appropriately substituted thiosalicylamide in place of the N-phenyl-thiosalicylamide and substituted boronic acid (in the manner of Examples 1 to 20) the following compounds are obtained: 2,3 - dihydro-2-phenyl-3-(2,6-dimethylphenyl) - 7 - (trifluoromethyl)-1,3,2-benzothiazaborin-4-(1H)-one; 2,3 - dihydro-2-mesityl-3-benzyl-1,3,2-benzothiazaborin - 4-(1H)- one; 2,3-dihydro-2-hydroxy - 3-(p-chlorophenyl)-6-methyl - 1,3,2-benzothiazaborin-4(1H)-one; 2,3-dihydro-2-phenethyl-3-(2,6 - dimethylphenyl)-1,3,2 - benzothiazaborin - 4(1H)-one; 2, 3-dihydro - 2-(n-butyl)-3-(2,6 - dimethylphenyl)-1,3,2-benzothiazaborin - 4(1H)-one; 2,3-dihydro - 2-(2-tolyl)-3-(2,6-dimethylphenyl)-1,3,2-benzothiazaborin - 4(1H)-one; 2,3-dihydro - 2-phenyl-3-(2,6 - dimethylphenyl)-8-chloro-1,3,2-benzothiazaborin-4(1H)-one; 2,3 - dihydro-2 - phenyl-3-(2,6-dimethylphenyl)-8 - sulfonamido-1,3,2-benzothiazaborin - 4(1H)-one; 2,3-dihydro-2-phenyl-3-2,6-dimethylphenyl)-7-methoxy - 1,3,2 - benzothiazaborin-4(1H)-one; 2,3-dihydro-2-phenyl-3-(2,6-dimethylphenyl)-7-bromo-1,3,2-benzothiazaborin - 4(1H)-one; 2,3-dihydro-2 - phenyl-3-(2,6-dimethylphenyl)-7 - chloro-1,3,2-benzothiazaborin - 4(1H)-one; 2,3 - dihydro-2-phenyl-3-(2,6-dimethylphenyl)-7-sulfonamido - 1,3,2 - benzothiazaborin-4(1H)-one.

What is claimed is:
1. A compound of the formula

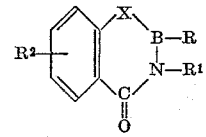

wherein R is a member selected from the group consisting of hydroxy, lower alkyl, cycloalkyl of 3 to 7 carbon atoms, phenyl, naphthyl and phenyl-lower alkyl, $R^1$ is a member selected from the group consisting of phenyl, naphthyl, phenyl-lower alkyl, di-lower alkylamino-lower alkyl, pyrrolidino-lower alkyl, morpholino-lower alkyl, piperidino-lower alkyl, piperazino-lower alkyl and homopiperazino-lower alkyl; $R^2$ is a member selected from the group consisting of hydrogen, halogen, nitro, amino, NH-lower alkanoyl, N-(lower alkanoyl)-$R^4$, sulfonamido, lower alkyl, lower alkoxy and halo-lower alkyl, $R^4$ is a member selected from the group consisting of di-lower alkylamino-lower alkyl, pyrrolidino-lower alkyl, morpholino-lower alkyl, piperidino-lower alkyl, piperazino-lower alkyl and homopiperazino-lower alkyl; X is a member selected from the group consisting of oxygen, sulfur, NH and N-$R^5$; $R^5$ has the same meaning as $R^4$; each of the foregoing phenyl and naphthyl groups bears 0 to 3 members selected from the group consisting of lower alkyl, halogen, hydroxy and lower alkoxy; and each of the foregoing heterocyclic groups bears 0 to 1 member of the group consisting of lower alkyl, hydroxy-lower alkyl and lower alkoxy-lower alkyl.

2. A compound of the formula

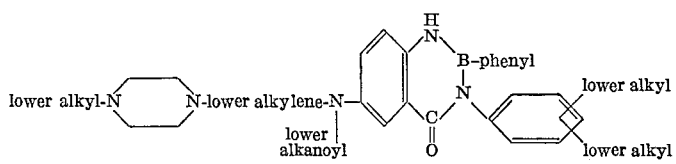

3. A compound of the formula

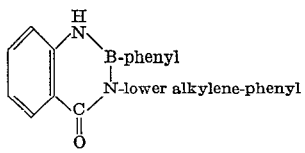

4. A compound of the formula

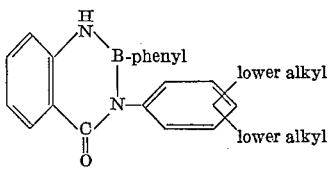

5. A compound of the formula

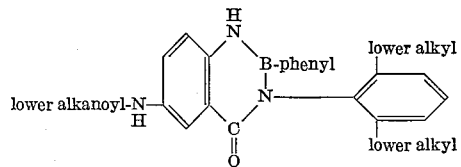

6. A compound of the formula

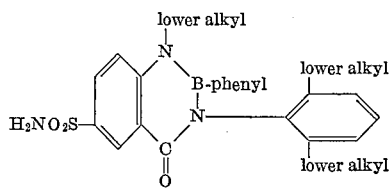

7. A compound of the formula

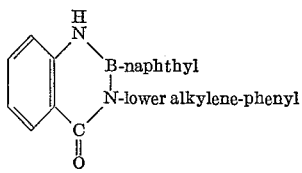

8. A compound of the formula

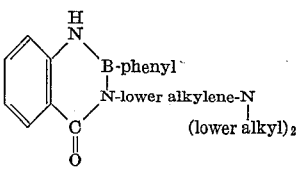

9. A compound of the formula

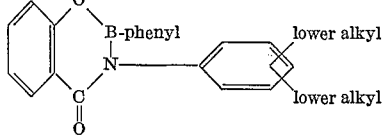

10. A compound of the formula

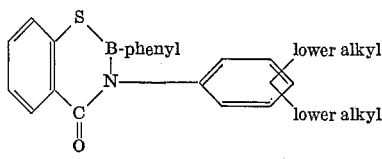

11. 2,3 - dihydro - 2 - phenyl - 3 - (2,6 - dimethylphenyl)-1,3,2-benzodiazaborin-4(1H)-one.

12. 2,3 - dihydro - 2 - naphthyl - 3 - (2,6 - dimethylphenyl)-1,3,2-benzodiazaborin-4(1H)-one.

13. 3 - benzyl - 2,3 - dihydro - 2 - phenyl - 1,3,2 - benzodiazaborin-4(1H)-one.

References Cited by the Examiner
UNITED STATES PATENTS 3,065,267 11/1962 Lang et al. _____ 260—551
3,135,789 6/1964 Fried et al. _____ 260—551

OTHER REFERENCES

Youngdale et al.: Jour. Medicinal Chemistry, vol. 7, pages 415 to 427, July 1964.

ALEX MAZEL, *Primary Examiner.*

H. R. JILES, J. W. ADAMS, *Assistant Examiners.*